Sept. 13, 1960 M. L. HOLLAND 2,952,446
HEATING AND COOLING ALTERNATOR VALVE
Filed Sept. 17, 1958 2 Sheets-Sheet 2
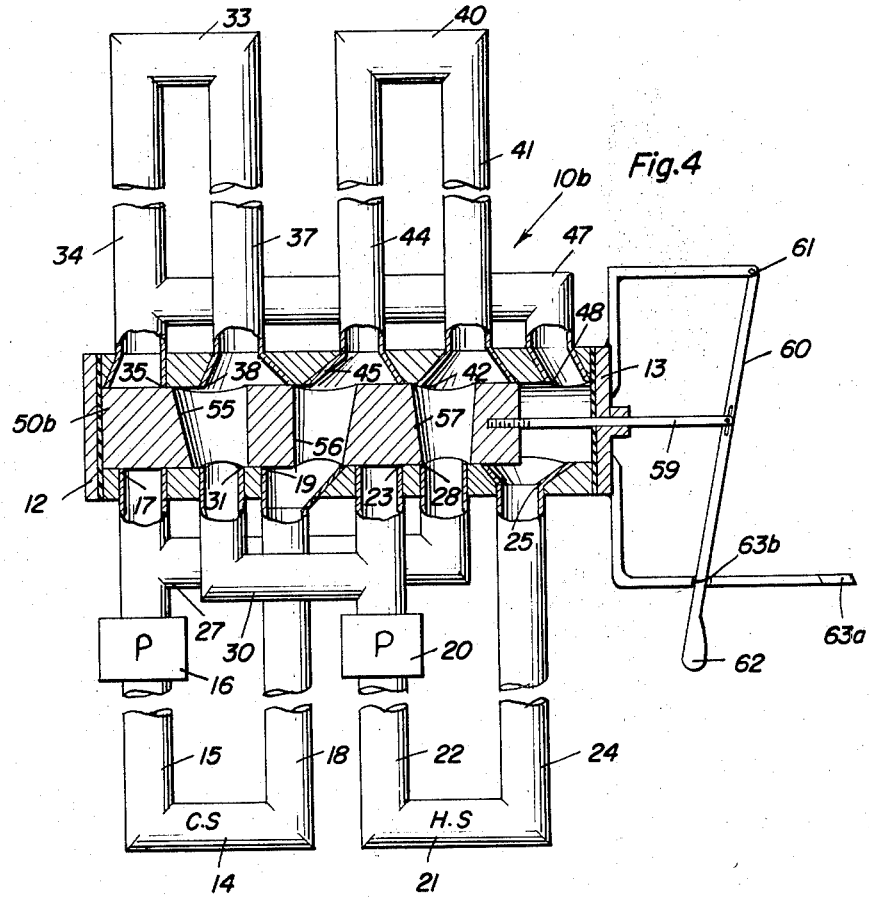
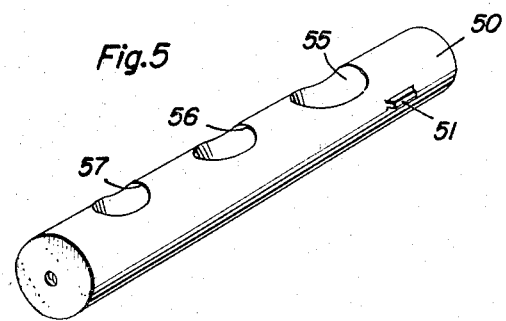
Melvin L. Holland
INVENTOR

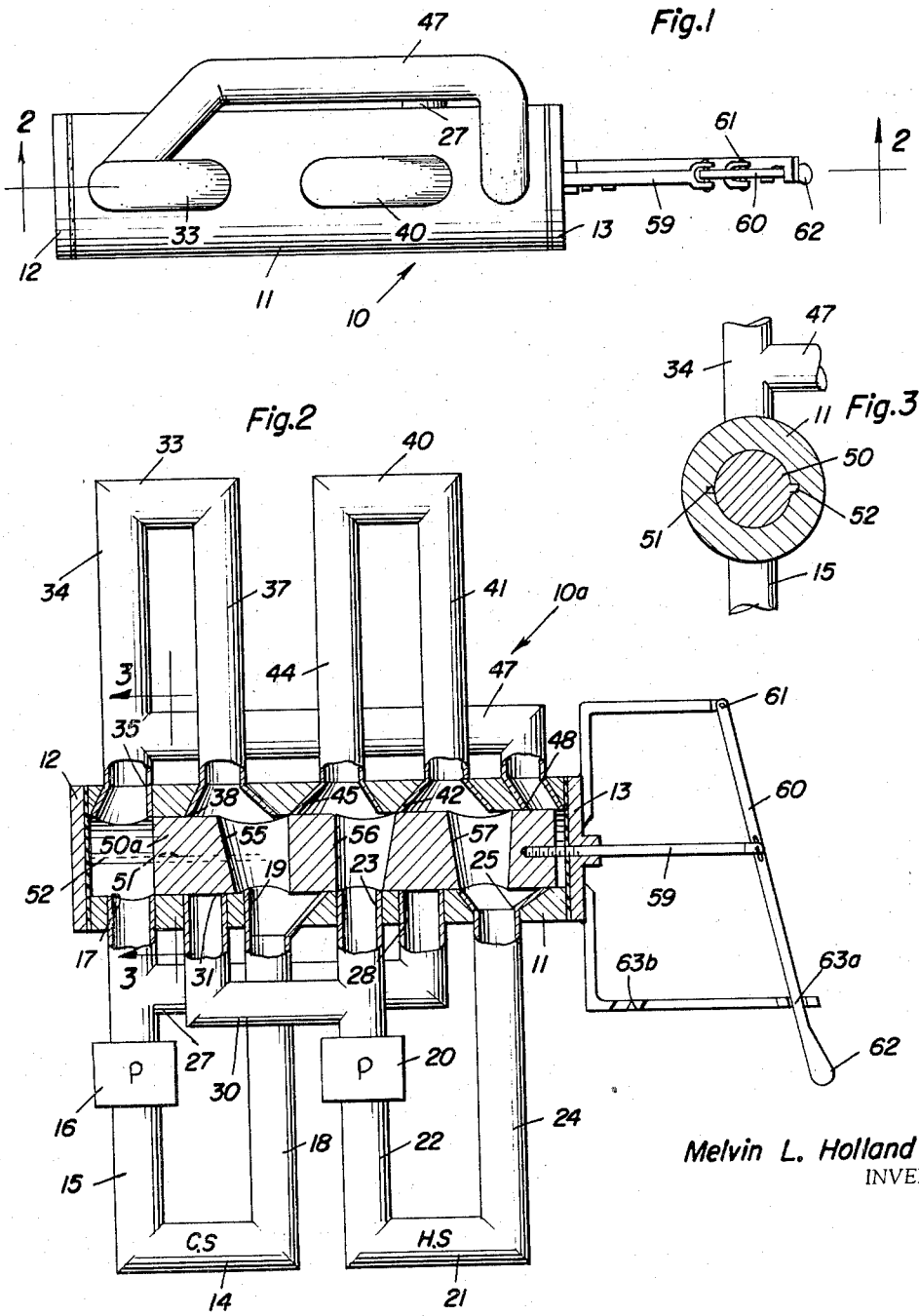
Melvin L. Holland
INVENTOR

United States Patent Office 2,952,446
Patented Sept. 13, 1960

2,952,446

HEATING AND COOLING ALTERNATOR VALVE

Melvin L. Holland, 13677 Carfax Ave., Bellflower, Calif.

Filed Sept. 17, 1958, Ser. No. 761,493

1 Claim. (Cl. 257—271)

This invention relates to heat control apparatus and more particularly to an alternator valve therefor.

It is an object of the present invention to provide an alternating heating and cooling valve especially designed for changing from a heating to a cooling condition, or vice versa, all under the control of a single valve member.

Another object of the present invention is to provide an alternating heating and cooling control system which can quickly and efficiently change between heating and cooling situations arising in chemical processes, preparation of food products, and refinery installations, instantaneously and without loss of operating efficiency.

Still a further object of the present invention is to provide a heating and cooling alternator of the above type that is especially designed to provide for the efficient transfer of heat between operating units thereof and which can effect the necessary change from one arrangement to another without interruption of the process or system being controlled.

Other objects of the invention are to provide a heating and cooling alternator bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a plan view of an alternator made in accordance with the present invention;

Figure 2 is a longitudinal cross sectional view taken along line 2—2 of Figure 1, showing the alternator in an adjusted position for supplying cooling fluid to the service load;

Figure 3 is a transverse cross sectional view taken along line 3—3 of Figure 2;

Figure 4 is a view similar to Figure 2, showing the alternator in a second adjusted position for supplying heating fluid to the service load; and Figure 5 is a perspective view of a slide valve forming a part of the present invention.

Referring now more in detail to the drawing, a heating and cooling alternator 10 made in accordance with the present invention is shown to include a cylindrical manifold 11 having an end plate 12, 13 at each end substantially closing the interior thereof. A cold fluid supply unit 14 has a supply line 15 and return line 18 connected by means of ports 17, 19 to the interior of the manifold 11. A fluid pressure pump 16 in the supply line 15 is operative to constantly pressurize the cold fluid for flow toward the direction of the supply line port 17.

A hot fluid supply unit 21, also having a supply line 22 and return line 24 connected to the interior of the manifold 11 by means of respective ports 23, 25 is similarly provided with a fluid pressure pump 20 that continually pressurizes the hot fluid for flow toward the supply line port 23. A bypass line 27 communicates with the cold fluid supply line 15 and another port 28 opening into the manifold 11 between the supply and return ports 23, 25 of the hot fluid supply unit 21. Similarly, another bypass duct 30 communicates with the hot fluid supply line 22 and another port 31 that opens into the manifold 11 intermediate the cold fluid supply line 15 and return line 18.

On the diametrically opposite side of the manifold 11, a service load unit 33 has a supply line 34 and return line 37 communicating, by means of ports 35, 38, respectively, with the interior of the manifold 11. On the same side of the manifold 11 as the service load unit 33, a dissipator and collector unit 40 is connected, by means of a supply line 41 and return line 44 to the interior of the manifold 11 by means of associated ports 45, 42, respectively. A by-pass duct 47 extends between the service load unit supply line 34 and a port 48 in the opposite end of the manifold.

A slide valve member 50 in the form of an elongated circular shaft is slidably supported within the interior of the manifold 11 for reciprocating longitudinal movement between opposite end positions in abutment with the opposite end plates 12, 13. This slide valve shaft is prevented from rotating by means of diametrically outwardly extending guides 51 that are slidably received within diametrically oppositely disposed grooves 52 on the inside surface of the manifold 11. This slide valve 50 is provided with a plurality of longitudinally spaced apart ducts 55, 56, 57, all of which extend diametrically in the same direction so as to provide selective communication between predetermined ones of the ports of each of the cold supply, hot supply, service load, and dissipator and collector units. A valve stem 59 connected to the slide valve shaft extends outwardly through one end plate 13 for reciprocating movement in response to adjustment of a lever 60 that is pivotally connected at its mid portion to the outer end of the stem. One end of the lever 60 is connected, by means of a pivot pin 61 to a frame supported by the manifold 11, while the opposite end thereof is provided with a handle 62 which is manually actuated between opposite extreme positions. Stops 63a, b limit movement of the lever 60 in both directions so as to limit movement of the slide valve 50 in both directions.

In Figure 2 of the drawing, the slide valve 50a is shown in a first adjusted position for providing cooling fluid to the service load 33, the respective ducts 55, 56, 57 so connecting each of the supply and return lines of the other units so as to provide maximum efficiency of flow and direct flow of the cooling fluid from the cold fluid supply unit 14 to the service load 33. In the position illustrated in Figure 4, the slide valve in the other adjusted position 50b is so positioned that the respective ducts thereof communicate between certain supply and return lines of the equipment to supply heating fluid from the hot fluid supply unit 21 to the service load 33 in the quickest possible manner. It will be noted that while the flow is in the same direction through the cold and hot fluid supply units at all times, the flow through the service load unit 33 and the heat dissipator and collector unit 40 is reversed for each different position of the slide valve, depending upon whether hot or cold fluid is supplied to the service load. As a result, the hot and cold fluids are routed in the shortest and most efficient paths to accomplish a changeover in a simple and efficient manner.

It is to be recognized that this valve can be efficiently used for rapid defrosting in low temperatures, for circulating low temperature secondary fluids, or rapid temperature changing in various industries, such as canneries, chemical treatment plants, refineries, and for hardening processes. The valve can also be used for brine, antifreeze, or other liquids. Furthermore, each loop of the various units could be a coil, boiler, chiller, condenser, tank, or the like, depending upon the particular use to which the system is put.

While various changes may be made in the detail construction, it shall be understood that such changes shall be within the spirit and scope of the present invention as defined by the appended claim.

What I claim as new and desire to protect by Letters Patent of the United States is:

A heating and cooling alternator comprising a hollow cylindrical manifold having an end plate at each end to enclose the interior thereof, a hot fluid supply unit connected at opposite ends to said manifold, a cold fluid supply unit connected at opposite ends to said manifold, a service load unit connected at opposite ends to said manifold, a heat dissipator and collector connected at opposite ends to said manifold, a slide valve slidably supported within said manifold for selected reciprocating longitudinal movement between opposite longitudinal positions within said manifold for controlling passage of hot and cold fluids between said hot and cold fluid supply units and said service load unit and said heat dissipator and collector unit, said hot fluid supply unit and said cold fluid supply unit each having supply and return lines connected to one side of said manifold, said service load unit and said heat dissipator and collector unit each having supply and return lines connected to a diametrically opposite side of said manifold, said slide valve being slidable within said manifold between opposite positions to abut the opposite end plates of the manifold and a plurality of transversely-extending ducts communicating with the diametrically opposite sides of the slide valve, said supply and return lines including ports opening into said manifolds along a line common to the end openings of said ducts of said slide valve and a lever supported at one end upon one end plate of the manifold, a valve stem connected to one end of said slide valve and pivotally connected to the opposite end to said lever, said lever having a handle, a by-pass line connected between the cold fluid supply line and said manifold, said manifold having a port between the supply and return ports of the hot fluid supply unit and receiving the by-pass line, said manifold having a port intermediate the cold fluid supply line and the return line, another by-pass duct extending between said last mentioned port and said hot fluid supply line and another by-pass line extending between a supply line of the service load unit and the opposite end of the manifold.

References Cited in the file of this patent

UNITED STATES PATENTS

| 2,357,706 | Toepperwein | Sept. 5, 1944 |
| 2,747,611 | Hewitt | May 29, 1956 |

FOREIGN PATENTS

| 594,280 | Germany | Apr. 6, 1934 |